(12) United States Patent
Hatanaka et al.

(10) Patent No.: US 11,590,837 B2
(45) Date of Patent: Feb. 28, 2023

(54) SADDLE-RIDING VEHICLE

(71) Applicant: KAWASAKI MOTORS, LTD., Hyogo (JP)

(72) Inventors: Tatsuya Hatanaka, Kobe (JP); Shunsuke Hayakoshi, Kobe (JP)

(73) Assignee: KAWASAKI MOTORS, LTD.

( * ) Notice: Subject to any disclaimer, the term of this patent is extended or adjusted under 35 U.S.C. 154(b) by 0 days.

(21) Appl. No.: 17/488,803

(22) Filed: Sep. 29, 2021

(65) Prior Publication Data

US 2022/0144075 A1    May 12, 2022

(30) Foreign Application Priority Data

Nov. 12, 2020   (JP) .............................. JP2020-188444

(51) Int. Cl.
| | |
|---|---|
| *B60K 11/06* | (2006.01) |
| *B62K 11/04* | (2006.01) |
| *F01P 5/06* | (2006.01) |
| *F01P 11/10* | (2006.01) |
| *B60K 11/08* | (2006.01) |

(52) U.S. Cl.
CPC ............. *B60K 11/06* (2013.01); *B60K 11/08* (2013.01); *F01P 5/06* (2013.01); *F01P 11/10* (2013.01); *B62K 11/04* (2013.01)

(58) Field of Classification Search
CPC ......... B60K 11/06; B60K 11/08; B62K 11/04; F01P 5/06; F01P 11/10
See application file for complete search history.

(56) References Cited

U.S. PATENT DOCUMENTS

| | | | | |
|---|---|---|---|---|
| 4,632,206 | A * | 12/1986 | Morinaka | ................ B62J 17/02 |
| | | | | 165/41 |
| 9,932,085 | B2 | 4/2018 | Nishida | |
| 2014/0034267 | A1* | 2/2014 | Hojo | ........................ B62J 23/00 |
| | | | | 165/51 |
| 2017/0267310 | A1 | 9/2017 | Nishida | |
| 2018/0112584 | A1* | 4/2018 | Kisaichi | ..................... F01P 3/18 |
| 2019/0061511 | A1* | 2/2019 | Kinoshita | .............. B60K 11/04 |
| 2019/0063301 | A1* | 2/2019 | Morotomi | .............. B60K 13/04 |

FOREIGN PATENT DOCUMENTS

JP              6224148          10/2017

* cited by examiner

*Primary Examiner* — Jacob M Amick

(57) ABSTRACT

A saddle-riding vehicle includes a radiator in front of an engine of the saddle-riding vehicle and on one lateral side of the vehicle in a vehicle widthwise direction with respect to a center line in the vehicle widthwise direction. The radiator includes: a radiator body that allows coolant of the engine to flow through the radiator body; a radiator fan at a rear face of the radiator body; and a fan cover that covers the radiator fan from a rear of the radiator fan to guide exhaust air from the radiator to the one lateral side in the vehicle widthwise direction.

9 Claims, 6 Drawing Sheets

LEFT  RIGHT

SADDLE-RIDING VEHICLE

CROSS REFERENCE TO THE RELATED APPLICATION

This application is based on and claims Convention priority to Japanese patent application No. 2020-188444, filed Nov. 12, 2020, the entire disclosure of which is herein incorporated by reference as a part of this application.

FIELD OF THE INVENTION

The present disclosure relates to a saddle-riding vehicle including a radiator on one lateral side of the vehicle in a vehicle widthwise direction.

BACKGROUND OF THE INVENTION

Some saddle-riding vehicles such as motorcycles have been known in which a radiator is disposed on one lateral side of the vehicle in a vehicle widthwise direction (for example, JP Patent No. 6224148). Such a radiator cools coolant of the engine with incoming wind during traveling and cools the coolant of the engine using a cooling fan during driving at low speed and during stopping. Exhaust air after cooling the coolant is discharged to the outside of the vehicle body from an exhaust air port in a shroud.

In such a vehicle, for example, when a fuel tank is increased in size and thus has a larger dimension in the vehicle widthwise direction, the shroud is arranged at a more outward position in the vehicle widthwise direction. In this case, the exhaust air from the radiator flows more outward in the vehicle widthwise direction during traveling, so that the exhaust air blows onto a leg of a rider, possibly causing deterioration in comfort of the rider during driving.

SUMMARY OF THE INVENTION

The present disclosure is to provide a saddle-riding vehicle that suppresses deterioration in comfort of a rider during driving.

A saddle-riding vehicle according to the present disclosure includes: an engine which is a drive source of the vehicle; and a radiator in front of the engine and on one lateral side of a vehicle body in a vehicle widthwise direction with respect to a center line in the vehicle widthwise direction. The radiator includes: a radiator body that allows coolant of the engine to flow through the radiator body; a radiator fan at a rear face of the radiator body; and a fan cover that covers the radiator fan from a rear of the radiator fan to guide exhaust air from the radiator to the one lateral side in the vehicle widthwise direction.

According to this constitution, the exhaust air from the radiator is guided by the fan cover toward the one lateral side in the vehicle widthwise direction. Therefore, it is possible to suppress the exhaust air flowing from the radiator toward a leg of a rider. Thus, it is possible to suppress deterioration in comfort of the rider during driving.

The present disclosure encompasses any combination of at least two features disclosed in the claims and/or the specification and/or the drawings. In particular, any combination of two or more of the appended claims should be equally construed as included within the scope of the present disclosure.

BRIEF DESCRIPTION OF THE DRAWING

The present disclosure will be more clearly understood from the following description of preferred embodiments thereof, when taken in conjunction with the accompanying drawings. However, the embodiments and the drawings are given only for the purpose of illustration and explanation, and are not to be taken as limiting the scope of the present disclosure in any way whatsoever, which scope is to be determined by the appended claims. In the accompanying drawings, like reference numerals are used to denote like or corresponding parts throughout the several views;

DETAILED DESCRIPTION OF THE INVENTION

Figure 1:
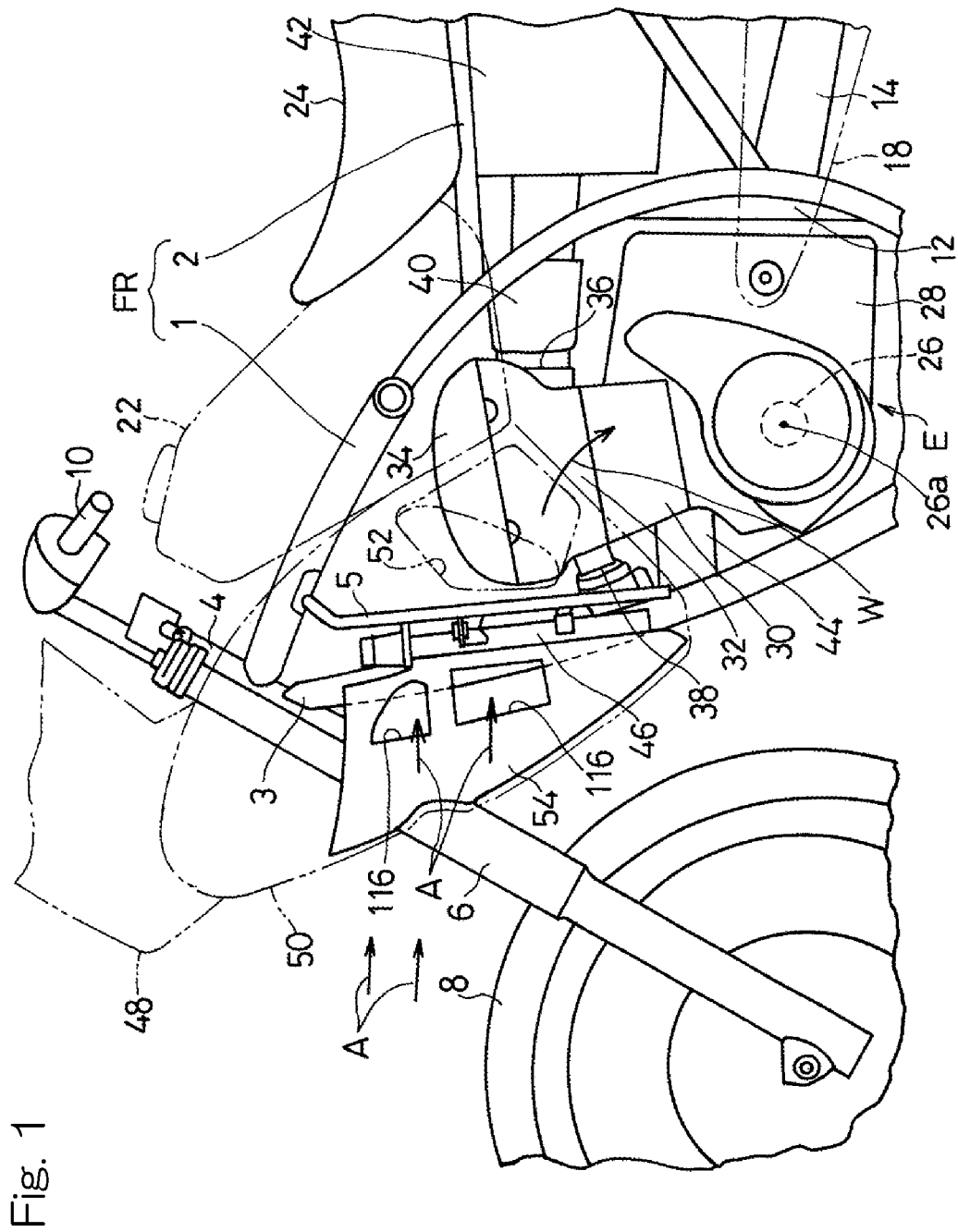
FIG. 1 is a side view showing a front part of a motorcycle which is a type of saddle-riding vehicle according to a first embodiment of the present disclosure.

Hereinafter, a preferred embodiment of the present disclosure will be described with reference to the drawings. FIG. 1 is a side view showing a front part of a motorcycle that is a type of saddle-riding vehicle according to a first embodiment of the present disclosure. In the present specification, the "right" and "left" correspond to "right" and "left" as a rider on the vehicle views, respectively. The "front" and "rear" correspond to "front" and "rear" in a direction of movement of the vehicle, respectively.

The motorcycle of the present embodiment includes a vehicle body frame FR which includes a main frame 1 which is a front half of the vehicle body frame FR and a rear frame 2 which is a rear half of the vehicle body frame FR. The main frame 1 extends rearward and diagonally downward from a head pipe 4 at a front end and then curves downward to extend in a vertical direction. The rear frame 2 extends rearward from a rear part of the main frame 1.

The vehicle body frame FR further includes a lower frame 3. The lower frame 3 extends downward from the head pipe 4, then curves rearward and extends in a front-to-rear direction or longitudinal direction of the vehicle body to be connected to a lower end portion of the main frame 1.

The vehicle body frame FR includes an accessory stay 5 extending in the vertical direction. The accessory stay 5 has an upper end connected to the main frame 1 and a lower end connected to the lower frame 3. Specifically, the accessory stay 5 extends from the main frame 1 outward in the vehicle widthwise direction, then extends downward, and further extends inward in the vehicle widthwise direction to be connected to the lower frame 3.

The head pipe 4 turnably supports a front fork 6 through a non-illustrated steering shaft. The front fork 6 has a lower end to which a front wheel 8 is attached. The front fork 6 has an upper end portion to which steering handle bars 10 are attached.

The main frame 1 has a rear end portion including a swing arm bracket 12. The swing arm bracket 12 supports a swing arm 14 in such a way that the swing arm can swing in the vertical direction. The swing arm 14 has a rear end portion to which a rear wheel (not illustrated) is attached.

An engine E, which is a drive source, is mounted below the main frame 1 and in front of the swing arm bracket 12. The engine E drives the rear wheel (not illustrated) through a power transmission member 18 such as a chain. A fuel tank 22 is disposed in an upper part of the main frame 1, and a seat 24 on which a driver sits is attached to the rear frame 2.

The engine E of the present embodiment is a water-cooled single-cylinder engine. However, the engine is not limited to a single-cylinder engine and may be a multicylinder engine such as a two-cylinder engine, a four-cylinder engine, or the like. The engine E includes: a crankshaft 26 forming a rotation shaft of the engine E; a crankcase 28 rotatably supporting the crankshaft 26; a cylinder 30 protruding upward from the crankcase 28; a cylinder head 32 connected to an upper part of the cylinder 30; and a cylinder head cover 34 attached to an upper part of a cylinder head 32. In the present embodiment, an axis 26a of the crankshaft 26 extends in the vehicle widthwise direction (i.e. left-to-right direction).

The cylinder head 32 has a rear face including an intake port 36 and a front face including an exhaust port 38. A fuel supply device 40 is connected to the intake port 36, and an air cleaner 42 is connected to the fuel supply device 40. The air cleaner 42 filters outside air to generate purified air. The fuel supply device 40 injects fuel into the purified air from the air cleaner 42 to generate air-fuel mixture and supplies the air-fuel mixture to the intake port 36. The fuel supply device 40 may be, for example, a throttle body including a fuel injection valve, a carburetor, or the like.

An exhaust pipe 44 is connected to the exhaust port 38. The exhaust pipe 44 curves rearward from the front face of the cylinder head 32 and extends rearward on the right side of the cylinder head 32. The exhaust pipe 44 has a rear end connected to an exhaust muffler (not illustrated).

Figure 2:
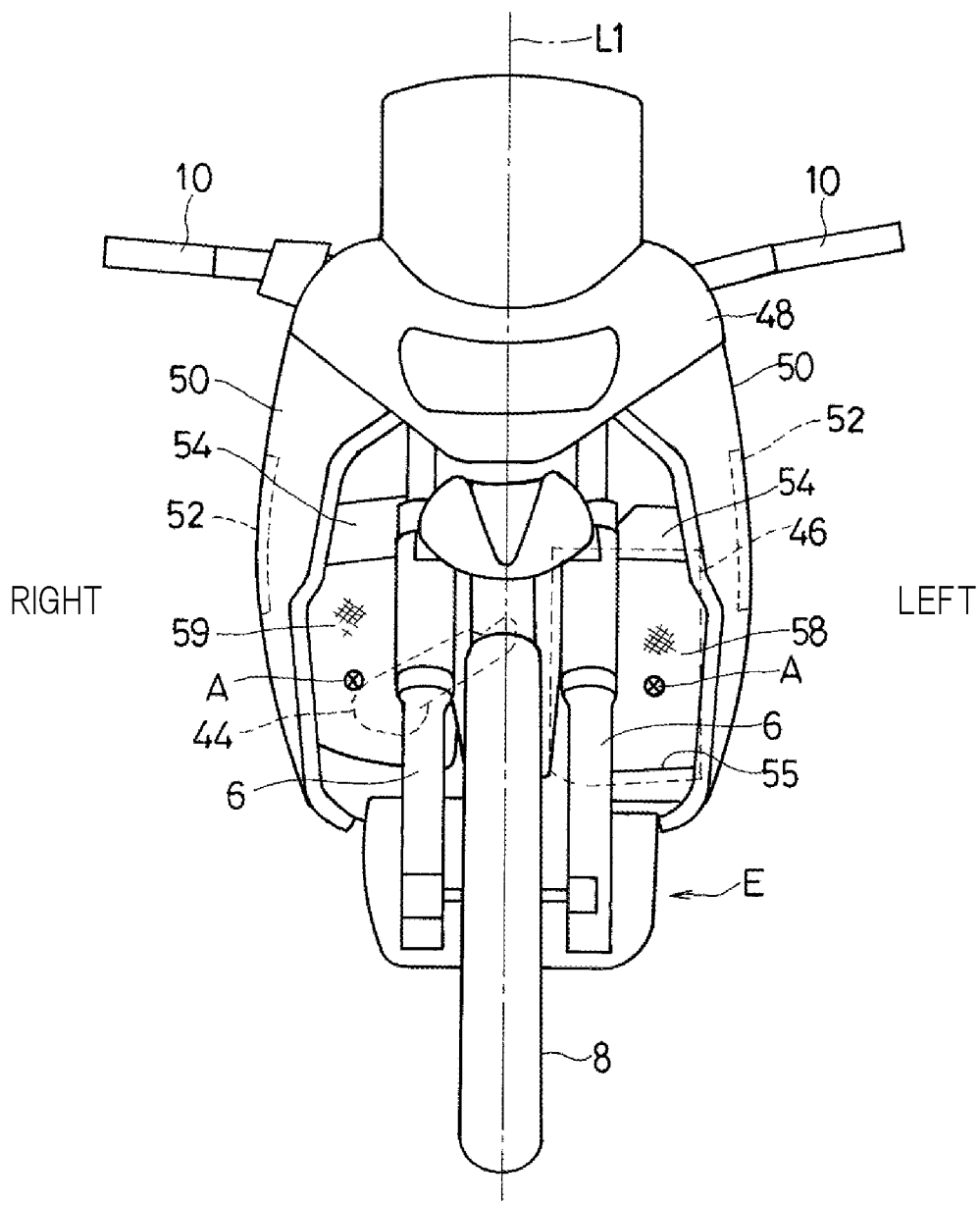
FIG. 2 is a front view of the motorcycle.

A radiator 46 is disposed in front of the engine E. The radiator 46 dissipates heat from coolant of the engine E and includes a tube through which the coolant flows and a cooling fin provided to the tube. In the present embodiment, water is used as the coolant. The radiator 46 is disposed on one lateral side of a vehicle body in the vehicle widthwise direction with respect to a center line L1 in the vehicle widthwise direction as indicated in FIG. 2. In the present embodiment, the radiator 46 is disposed on the left side of the vehicle body. The radiator 46 is disposed such that a longitudinal direction of the radiator extends in a vertical direction; i.e., the radiator is installed vertically. The radiator 46 will be described later in detail. In the following description, the left side of the vehicle body is referred to as one lateral side in the vehicle widthwise direction, and the right side of the vehicle body is referred to as the other lateral side in the vehicle widthwise direction.

A front cowl 48 is attached to a front part of the vehicle body. The front cowl 48 covers an anterior area with respect to the head pipe 4 as shown in FIG. 1. A pair of left and right shrouds 50 as shown in FIG. 2 are disposed behind and below the front cowl 48. The shrouds 50 are removably attached to the vehicle body frame FR by fastening members (not illustrated) such as bolts. The shroud 50 on the left side covers the radiator 46 from laterally outside. Each shroud 50 includes an exhaust air port 52 defined therein. The exhaust air port 52 discharges exhaust air from the radiator 46 to the outside of the vehicle body. In FIG. 1, the front cowl 48 and the shroud 50 are illustrated with double-dotted lines.

A pair of left and right inner cowls 54 are disposed in front of the radiator 46. The inner cowl 54 on the left side guides incoming wind toward the radiator 46. Specifically, as shown in the perspective view of FIG. 6 when viewed from the front right side, the inner cowl 54 includes an air introduction port 55, which is at an inner position in the vehicle widthwise direction and introduces incoming wind into the radiator 46, as well as air guide plates 56 which are at an outer position and at an upper position with respect to the air introduction port 55 and guide the incoming wind into the air introduction port 55. A first (left-side) screen 58 having a latticed pattern is attached to the air introduction port 55. The first screen 58 protects the radiator 46 from stone chips or the like during traveling. That is, the screen 58 allows incoming wind to pass through the screen but does not allow foreign objects such as stone chips or the like to pass through the screen 58. As shown in FIG. 2, a second (right-side) screen 59 having a latticed pattern and covering an anterior area of the exhaust pipe 44 is disposed on the right side of the vehicle body with respect to the first screen 58.

Figure 6:
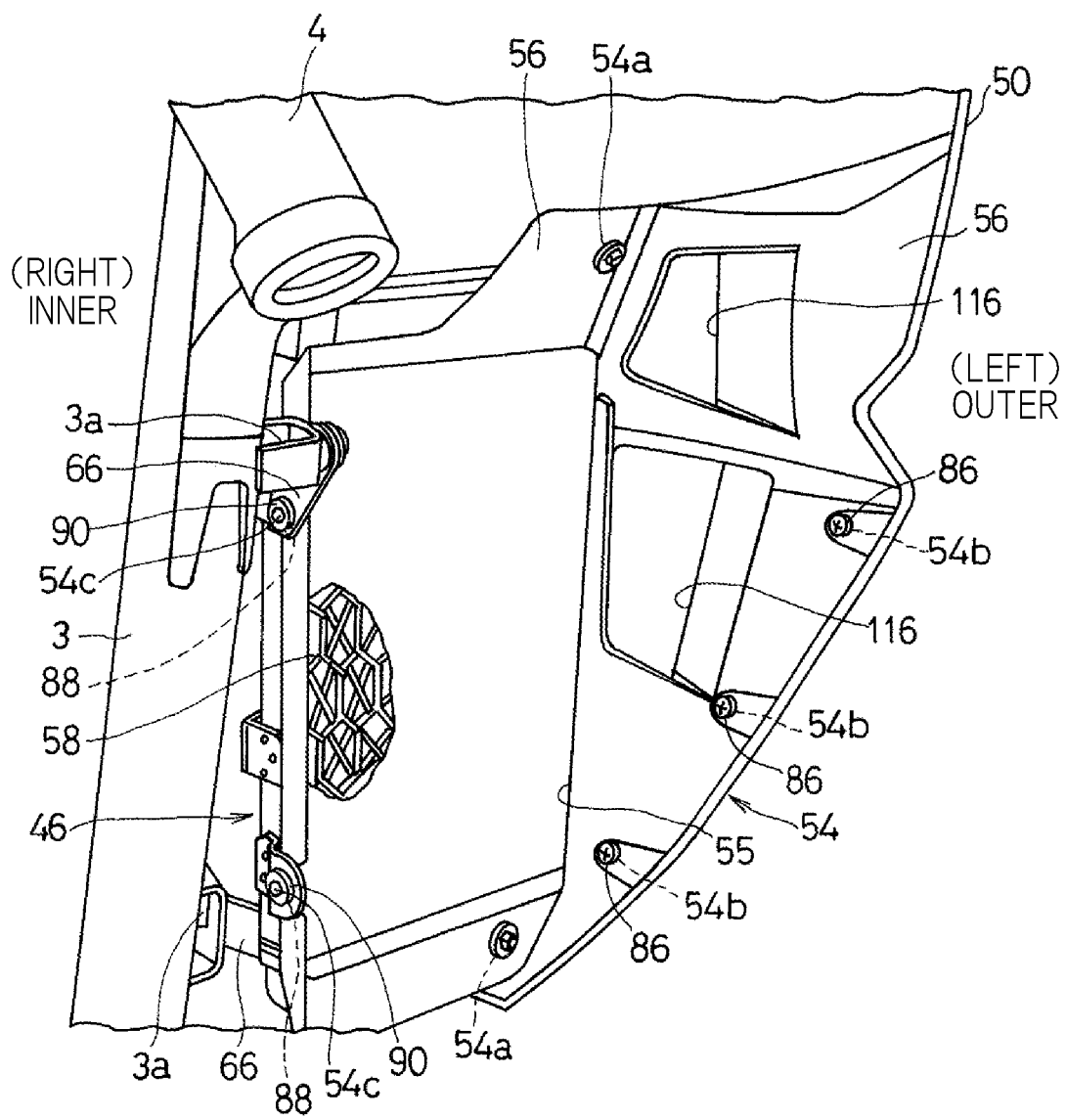
FIG. 6 is a perspective view of the inner cowl as viewed from a front side of the vehicle.

As shown in FIG. 6, the inner cowl 54 includes bolt insertion holes 54a above and below the screen 58. In addition, the air guide plate 56 of the inner cowl 54 which is located at the outer position includes three attachment holes 54b extending in the vehicle widthwise direction and arranged in the vertical direction.

Figure 3:
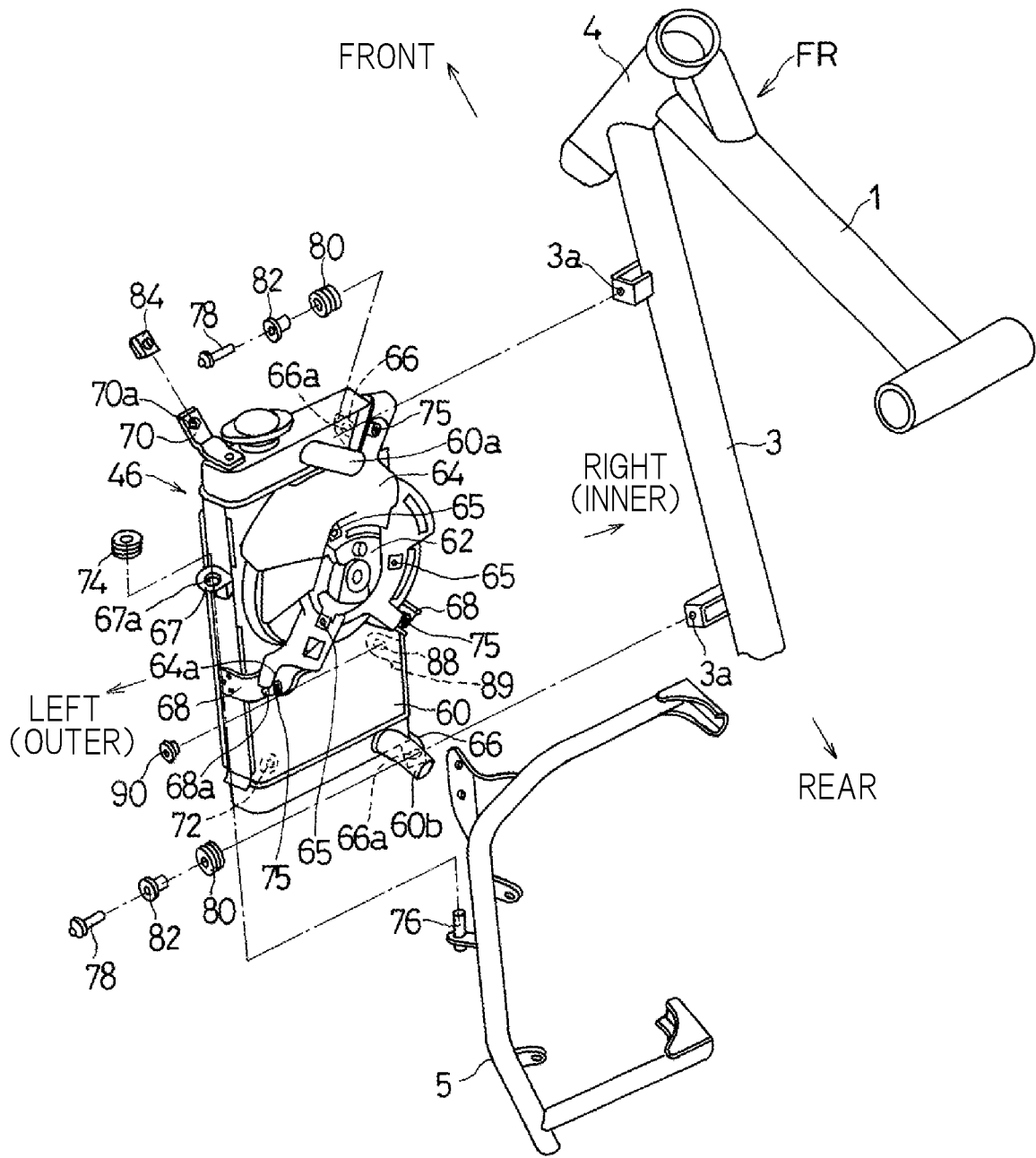
FIG. 3 is a perspective view showing a radiator of the motorcycle.

As shown in FIG. 3, the radiator 46 includes a radiator body 60, a radiator fan 62, and a fan cover 64. The radiator body 60 is a cooling device that dissipates heat from cooling water of the engine E and takes heat from the cooling water flowing inside the radiator body through air passing between the tube and the cooling fin. The radiator fan 62 is, for example, an electric fan and is controlled by an electronic control unit (not illustrated) of the engine. The radiator fan 62 is disposed on the rear face of the radiator body 60 and feeds wind to the radiator body 60, for example, during driving at low speed or during idling.

That is, the radiator 46 dissipates heat from the cooling water of the engine E with the incoming wind during traveling and dissipates heat from the cooling water of the engine E with the wind fed from the radiator fan 62 during idling. The fan cover 64 covers the radiator fan 62 from the rear and guides the exhaust air from the radiator 64 mainly toward the one lateral side in the vehicle widthwise direction (i.e. left side). The fan cover 64 will be described later in detail.

The radiator body 60 has an upper part including a cooling water inlet 60a and a lower part including a cooling water outlet 60b. The cooling water after cooling the engine is introduced into the radiator 46 via the cooling water inlet 60a, loses heat through the radiator 46, and is then returned to the engine E via the cooling water outlet 60b.

The radiator body 60 of FIG. 3 includes radiator stays 66, 66 at upper and lower positions on an inner lateral face of the radiator body in the vehicle widthwise direction. The radiator body 60 also includes a radiator stay 67 in a middle position in the vertical direction on an outer lateral face of the radiator body in the vehicle widthwise direction. Each radiator stay 66 on the inner lateral face includes an insertion hole 66a extending in the vehicle widthwise direction. The radiator stay 67 on the outer lateral face includes an insertion hole 67a extending in the vertical direction.

The radiator body 60 includes a cover stay 68 at an inner position in the vehicle widthwise direction on an upper face of the radiator body. In addition, the radiator body 60 includes cover stays 68 at a middle position in the vertical direction on the inner lateral face in the vehicle widthwise direction and at a middle position in the vertical direction on the outer lateral face in the vehicle widthwise direction. On the outer lateral face in the vehicle widthwise direction, the cover stay 68 is located below the radiator stay 67. Each cover stay 68 includes a threaded hole 68a extending in the front-to-rear direction.

The radiator body 60 includes a cowl bracket 70 at an outer position in the vehicle widthwise direction on the upper face. The cowl bracket 70 includes an attachment hole 70a. In addition, the radiator body 60 includes a cowl attachment threaded hole 72 extending in the front-to-rear direction at an outer lower position in the vehicle widthwise direction on a front face of the radiator body.

The fan cover 64 is coupled to a rear face of the radiator fan 62 by three fastening members 65 to take the form of a subassembly. This subassembly is removably attached to the rear face of the radiator body 60 by fastening members 75. Specifically, the fastening members 75 are inserted into attachment holes 64a in the fan cover 64 from the rear and are fastened to the threaded holes 68a of the cover stays 68 of the radiator body 60. In this way, the radiator body 60, the radiator fan 62, and the fan cover 64 are put together to form the radiator 46. In the present embodiment, three fastening members 75 are used; however, there may be more or less fastening members 75 than three.

The radiator 46 is attached to the vehicle body through the three radiator stays 66, 66, 67. Specifically, a tubular damper 74 which is an elastic member is attached to the insertion hole 67a of the radiator stay 67 at the outer position in the vehicle widthwise direction, and the damper 74 is fitted to a pin 76 formed in the accessory stay 5.

Further, fastening members 78 are inserted, from outside in the vehicle widthwise direction, into the insertion holes 66a of the two radiator stays 66 at inner positions in the vehicle widthwise direction and are fastened to threaded holes 3a in the lower frame 3 of the vehicle body frame FR. In particular, tubular dampers 80 which are elastic members are attached to the insertion holes 66a of the radiator stays 66 of the radiator body 60, and flanged tubular collars 82 are inserted into hollow holes of the dampers 80. In this state, the fastening members 78 are inserted into the collars 82 and are fastened to the threaded holes 3a of the lower frame 3. Each threaded hole 3a is, for example, a weld nut. In this manner, the radiator 46 is supported by the vehicle body frame FR. The supporting structure for the radiator 46 is not limited to this configuration.

In the present embodiment, the three cover stays 68, 68, 68 at which the fan cover 64 is attached are located at positions corresponding to the positions of the three radiator stays 66, 66, 67 at which the radiator 46 is attached. This makes it possible to prevent vibration of the fan cover 64.

Figure 4:
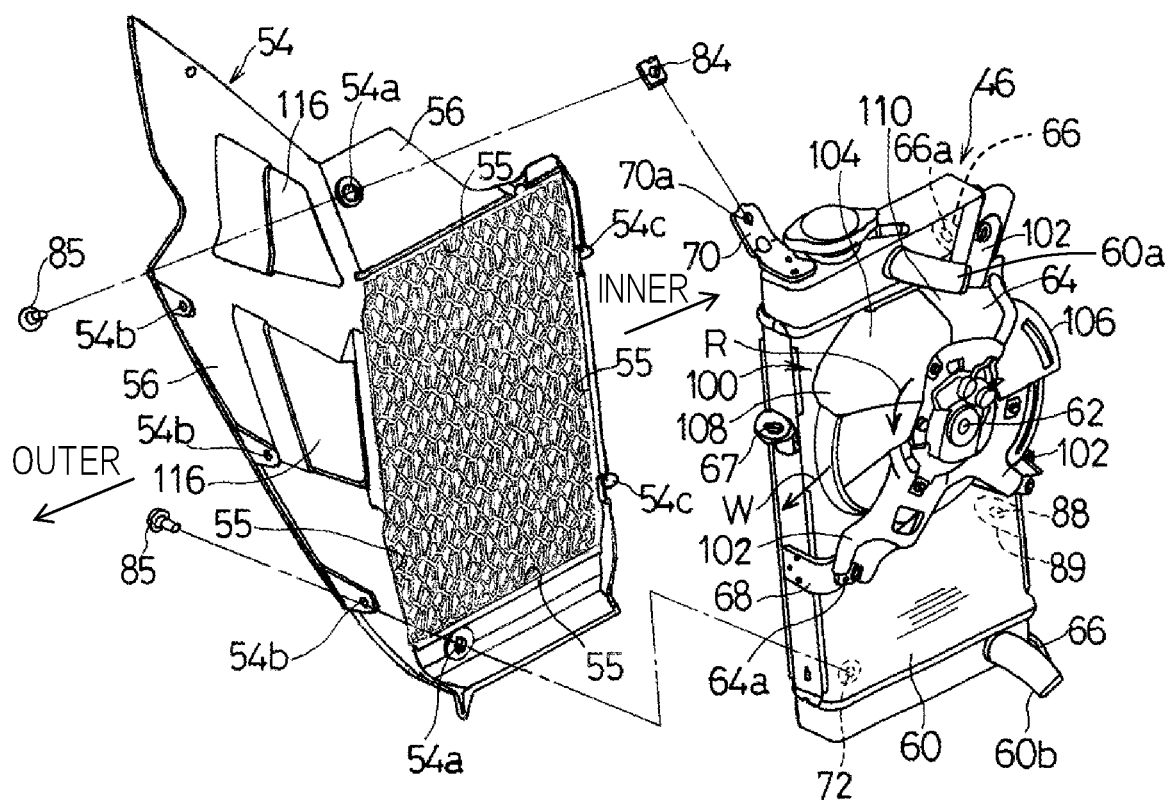
FIG. 4 is a perspective view showing the radiator and an inner cowl.

As shown in FIG. 4, the inner cowl 54 is attached to the radiator body 60 by fastening members 85 through the cowl bracket 70 and the cowl attachment threaded hole 72. In particular, a crimp nut 84 is attached to the cowl bracket 70 of the radiator body 60, and the fastening member 85 is inserted, from the front side of the vehicle body, into the upper bolt insertion hole 54a of the inner cowl 54 and is fastened to the crimp nut 84. Another fastening member 85 is inserted, from the front side of the vehicle body, into the lower bolt insertion hole 54a of the inner cowl 54 and is fastened to the cowl attachment threaded hole 72 of the radiator body 60. In this manner, the middle part of the inner cowl 54 in the vehicle widthwise direction is supported by the radiator body 60.

On the inner lateral face of the inner cowl 54 in the vehicle widthwise direction, there are two protrusions 54c protruding inward in the vehicle widthwise direction and arranged in the vertical direction. On the inner lateral face of the radiator body 60 in the vehicle widthwise direction, the radiator body 60 includes attachment holes 88 at positions corresponding to the positions of the protrusions 54c. In the present embodiment, the radiator body 60 includes an attachment piece 89 made of a sheet metal and including an attachment hole 88. A tubular elastic body 90 (FIG. 6) is attached to each attachment hole 88, and the protrusion 54c is fitted into a hollow hole of the elastic body 90. In this manner, the inner part of the inner cowl 54 in the vehicle widthwise direction is supported by the radiator body 60. As shown in FIG. 6, in the present embodiment, the upper attachment hole 88 is located in the radiator stay 66.

Further, threaded bodies 86 are inserted, from the inner side in the vehicle widthwise direction, into the three attachment holes 54b at outer positions in the inner cowl 54 and are fastened to the attachment holes (not illustrated) in the shroud 50. In this manner, the outer part of the inner cowl 54 in the vehicle widthwise direction is supported by the vehicle body frame FR through the shroud 50.

The fan cover 64 will be described in detail. The fan cover 64 is made of, for example, a sheet metal and includes: a cover part 100 mainly covering a rear part of the radiator fan 62; and attachment parts 102 extending from the cover part 100 in a radiating manner as shown in FIG. 4. There are three attachment parts 102, and the respective attachment parts 102 include the above-mentioned attachment holes 64a.

The cover part 100 of the fan cover 64 includes: a rear wall 104 covering an upper half of the radiator fan 64 from the rear; a first lateral wall 106 connected to the rear wall 104 and covering the radiator fan 64 from the right side (i.e. other lateral side in the vehicle widthwise direction); and a second lateral wall 108 connected to the rear wall 104 and covering the radiator fan 64 from the left side (i.e. one lateral side in the vehicle widthwise direction). The cover part 100 further includes an upper wall 110 connected to the rear wall 104 and both lateral walls 106, 108. That is, the lower half of the fan cover 64 is open.

The first lateral wall 106 prevents the exhaust air exiting the radiator 46 from flowing toward the right side. This means that the fan cover 64 is attached to prevent flow of the exhaust air (hot wind) toward the right side of the vehicle body. This makes it easy to arrange components such as a canister and an antilock brake system (ABS) unit on the right side of the vehicle body, so that flexibility in design is increased.

The second lateral wall 108 is located in the upper half of the fan cover 64, and the second lateral wall 108 includes a protruding part 112 (FIG. 5) protruding downward toward the left side (i.e. one lateral side in the vehicle widthwise direction). The second lateral wall 108 is located in the upper half of the fan cover 64 so as to guide the exhaust air from the radiator 46 toward the left side. That is, the second lateral wall 108 forms a guide wall that guides the exhaust air W from the radiator 46 toward the one lateral side in the vehicle widthwise direction (i.e. left side).

In the present embodiment, the guide wall (second lateral wall) 108 guides the exhaust air from the radiator 46 downward and toward the one lateral side in the vehicle widthwise direction. Specifically, the guide wall 108 guides the exhaust air W toward the exhaust air port 52 of the shroud 50 shown in FIG. 1. That is, the guide wall 108 shown in FIG. 4 causes the collected exhaust air (hot air) W to swirl in a rotation direction R of the radiator fan 62 to be exhausted to the outside in the vehicle widthwise direction. Thus, the guide wall 108 guides the exhaust air outward to discharge the exhaust air to the outside of the vehicle body while guiding the exhaust air downward to stir the hot air which otherwise tends to stay below the radiator 46.

Figure 5:
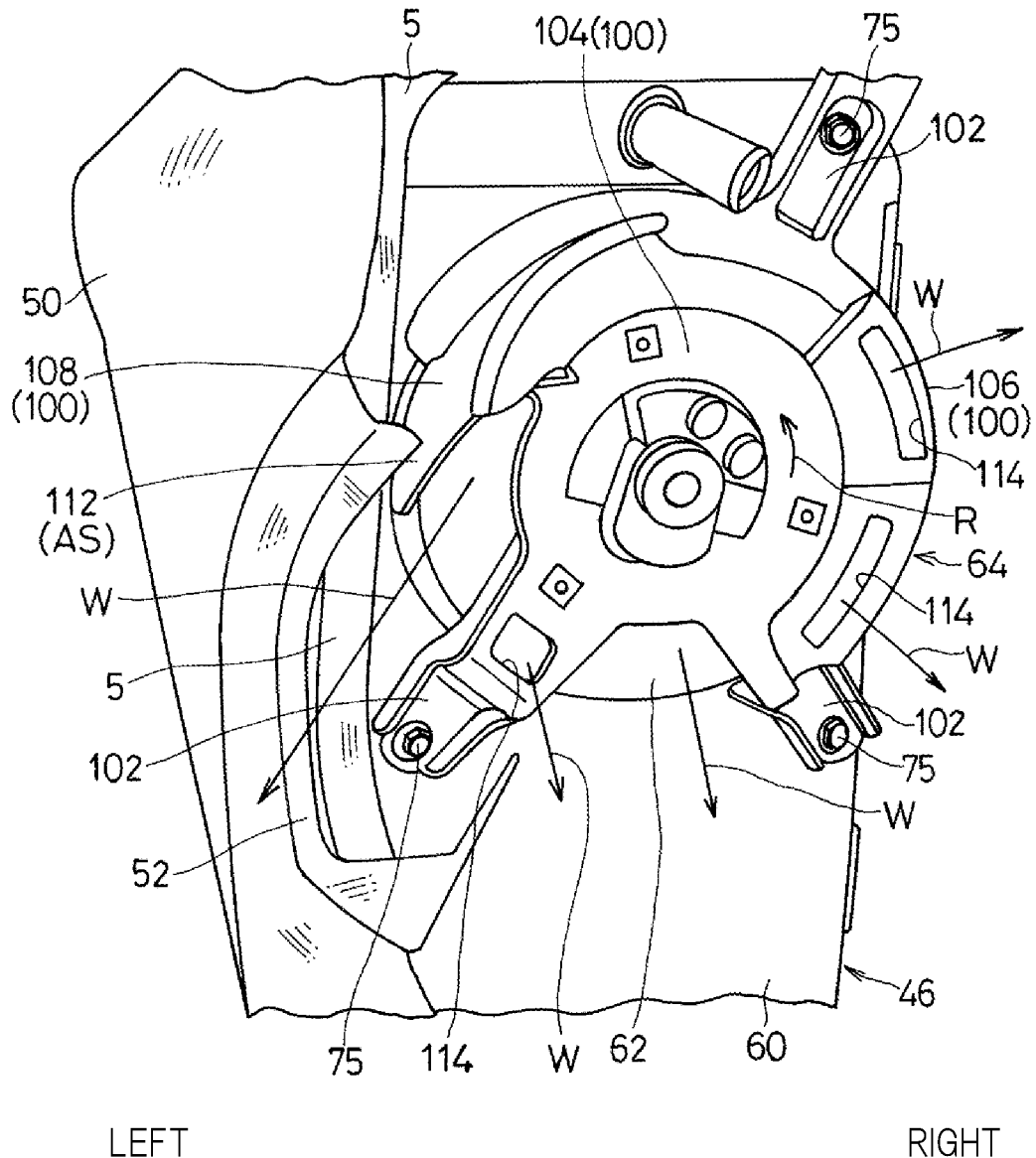
FIG. 5 is a perspective view of the radiator as viewed from a rear of the vehicle.

The fan cover 64 further includes an intrusive-flow prevention structure or a return flow prevention structure AS shown in FIG. 5. The intrusive-flow prevention structure AS prevents the exhaust air W exiting the radiator fan 62 from flowing frontward of the radiator 46. Since no incoming wind comes in during idling, hot air tends to stay inside the shroud 50, and such hot air may pass through a gap between the radiator 46 and the accessory stay 5 to flow frontward. If hot air flows frontward of the radiator 46, the hot air having flown into this area may be introduced into the radiator 46 at the start of driving, deteriorating the heat dissipation effect. The intrusive-flow prevention structure AS prevents such flow of the hot air.

In the present embodiment, the protruding part 112 extending rearward and downward of the second lateral wall 108 of the fan cover 64 includes the intrusive-flow prevention structure AS. This means that the protruding part 112 prevents intrusive flow of the exhaust air W from the radiator fan 62 frontward of the radiator 46. Thus, in the present embodiment, the protruding part 112 serves both to introduce the exhaust air W from the radiator into the exhaust air port 52 of the shroud 50 and to prevent intrusive flow of the hot air inside the shroud 50 frontward of the radiator 46. These functions may be achieved by separate members.

The lower half of the cover part 100 of the fan cover 64 opens rearward and downward. In particular, the rear wall 104 of the cover part 100 has a lower edge located above a lower edge of the radiator fan 62, and the cover part 100 opens downward because the cover part 100 includes no lower wall. This makes it possible to disperse hot wind downward of the radiator 46 during traveling and to secure an intake air amount of the radiator fan 62 during idling.

The fan cover 64 includes a cover opening 114 defined therein. The cover opening 114 discharges the exhaust air W from the radiator 46 rearward, and increases flow of air passing to be supplied to the radiator fan 62. In the present embodiment, there are two cover openings 114 arranged vertically in an inner part of the rear wall 104 of the fan cover 64 in the vehicle widthwise direction. Further, there is another cover opening 114 in the attachment part 102, of the fan cover 64, which is located at an outer position in the vehicle widthwise direction. This makes it possible to disperse hot wind during traveling and to secure an intake air amount of the radiator fan 62 during idling. The number and position of the cover openings 114 are not limited to those of the present embodiment.

As shown in FIG. 6, the inner cowl 54 includes a cowl opening 116 that is located at an outer lateral part of the inner cowl 54 in the vehicle widthwise direction and guides incoming wind rearward of the radiator 46. Specifically, the cowl opening 116 is located in the air guide plate 56 of the inner cowl 54. During traveling, incoming wind is guided from the cowl opening 116 rearward of the radiator 46 along an inner surface of the shroud 50 so as to stir the hot air. During idling, the exhaust air from the radiator fan 62 can also be discharged from the cowl opening 116 so as to suppress the hot air staying inside the shroud 50.

In the present embodiment, there are two cowl openings 116 arranged vertically with an interval in the air guide plate 56. Specifically, the cowl openings 116 are located at an upper part and a middle part of the air guide plate 56 in the vertical direction. That is, there is no cowl opening 116 in a lower part of the air guide plate 56. The number and position of the cowl openings 116 are not limited to those of the present embodiment.

Since the air introduction part of the inner cowl 54 guides incoming wind to the radiator 46, it is not a typical option to provide an opening in this part because such an opening would reduce an amount of incoming wind to be introduced into the radiator 46 and thus deteriorate the heat dissipation effect. As a result of intensive studies, however, the present inventors found that if the position and shape of an opening is modified suitably, provision of such an opening in the air introduction part (air guide plate 56) of the inner cowl 54 does not substantially affect the heat dissipation effect of the radiator 46.

Provision of the cowl opening 116 in the inner cowl 54 makes it possible to introduce incoming wind from the cowl opening 116 into the exhaust air W of the radiator 46 during traveling so as to stir the exhaust air and then flow it rearward. A rear area of the lower part of the inner cowl 54 is the area where hot air tends to stay during idling because the exhaust air from the radiator fan 62 is guided to this area. Therefore, if there is a cowl opening in the lower part of the air guide plate 56, such hot air may flow frontward of the radiator 46 through the cowl opening, and the hot air having flown into this area may be sucked by the radiator 46. For this reason, in the present embodiment, there is no cowl opening in the lower part of the air guide plate 56.

The effects of the present embodiment will be described. When the engine E as shown in FIG. 1 is started, a cooling water pump (not illustrated) is driven in association with rotation of the crankshaft 26, so that cooling water is supplied to respective parts of the engine E. The cooling water after cooling the engine is introduced into the radiator 46 via the cooling water inlet 60*a* of FIG. 3, loses heat through the radiator 46, and is then returned to the engine E via the cooling water outlet 60*b*.

While a vehicle travels, incoming wind A is introduced from the air introduction port 55 of the inner cowl 54 in FIG. 2 into the radiator 46, and the cooling water loses heat through heat exchange with the incoming wind A. During idling or driving at low speed, the cooling water loses heat through heat exchange with the wind fed from the radiator fan 62 shown in FIG. 5.

The exhaust air W of the radiator 46 after the heat exchange is guided by the fan cover 64 to be discharged outside of the vehicle body via the exhaust air port 52 of the shroud 50. While the exhaust air is being guided, the first lateral wall 106 of the fan cover 64 prevents the exhaust air W (hot wind) from moving toward the right side of the vehicle body. Therefore, the exhaust air W of the radiator 46 does not flow into the right side of the vehicle body.

The second lateral wall (guide wall) 108 of the fan cover 64 effectively guides the exhaust air W from the radiator 46 to the exhaust air port 52 of the shroud 50. In addition, since the fan cover 64 opens downward and rearward, the exhaust air W is dispersed downward and rearward of the fan cover 64. Further, the exhaust air W is discharged rearward and downward via the cover opening 114 of the fan cover 64, so that the exhaust air W (hot air) is dispersed. Moreover, incoming wind A is introduced from the cowl opening 116 of the inner cowl 54 shown in FIG. 1 and passes rearward through the outer lateral side of the radiator 46, and the exhaust air W is dispersed by the incoming wind A so as to be discharged rearward.

During idling, the radiator fan 62 shown in FIG. 5 can suck air in from the lower and rear sides of the fan cover 64, which are open, as well as from the cover opening 114 of the fan cover 64. Therefore, a sufficient air amount can be secured even when the fan cover 64 is attached. As in the case of traveling, the exhaust air W of the radiator 46 after heat exchange is guided by the second lateral wall (guide wall) 108 to the exhaust air port 52 of the shroud 50 and is dispersed to the open lower and rear sides of the fan cover 64.

While the exhaust air is being guided, the intrusive-flow prevention structure AS (protruding part 112) prevents the hot air (exhaust air W) from moving frontward through the gap between the radiator 46 and the accessory stay 5. Since there is no cowl opening 116 (FIG. 6) in the lower part of the inner cowl 54, the exhaust air W guided downward will not flow frontward.

Thus, in the present embodiment, the fan cover 64 is attached, so that the first lateral wall 106 prevents the hot wind W from flowing toward the right side of the vehicle body. As a result, the exhaust air W concentratedly flows toward the left side of the vehicle body. However, the second lateral wall (guide wall) 108 makes it possible to effectively discharge the exhaust air W to the exhaust air port 52, and the cover opening 114 makes it possible to disperse the exhaust air W. Further, incoming wind A is supplied through the cowl opening 116 (FIG. 6) of the inner cowl 54, so that the hot air (exhaust air W) is further dispersed.

According to the above constitution, the exhaust air W from the radiator 46 is guided by the second lateral wall (guide wall) 108 of the fan cover 64 to the one lateral side in the vehicle widthwise direction. This makes it possible to suppress the exhaust air W flowing toward a leg of a driver. Thus, it is possible to suppress deterioration in comfort of the rider during driving.

Moreover, the first lateral wall 106 of the fan cover 64 prevents the exhaust air W from flowing toward the right side, and therefore, it is also possible to suppress the exhaust air W flowing toward the right leg of the driver. In particular, since the exhaust pipe 44 shown in FIG. 2 is disposed on the right side of the engine E, it is possible to suppress the exhaust air W of the radiator 46 heated by the exhaust pipe 44 and flowing toward the leg of the driver.

Further, the lower half of the fan cover 64 shown in FIG. 5 opens rearward and downward, and therefore, it is possible to suppress the exhaust air W flowing toward the left leg of the driver thanks to the guide wall 108 of the upper half of the fan cover 64, while securing an amount of air flow thanks to the open lower half. Since the amount of air flow is secured, dispersion of the exhaust air W is promoted, and an intake air amount of the radiator fan 62 is secured.

The guide wall 108 guides exhaust air W from the radiator 64 leftward and downward. This makes it possible to stir hot air below the radiator 46. Consequently, it is possible to suppress heat staying below the radiator 46.

Further, the protruding part 112 of the fan cover 64 prevents the exhaust air W exiting the radiator fan 62 from flowing frontward of the radiator 46. This makes it possible to prevent the exhaust air W exiting the radiator fan 62 from going back to an anterior area of the radiator 46. Thus, cooling performance of the radiator 46 can be secured.

The fan cover 64 includes the cover opening 114. This makes it possible to discharge the exhaust air W from the radiator rearward and to secure an intake air amount of the radiator fan 62 during idling. Thus, by dispersing the exhaust air W and securing the amount of air flowing in, it is possible to prevent heat accumulation inside the shroud 50 and to increase workload of the radiator fan 62.

Further, the inner cowl 54 shown in FIG. 1 includes the cowl opening 116 in the outer lateral part of the inner cowl 54 in the vehicle widthwise direction, and the cowl opening 116 guides the incoming wind A to laterally outside of the inner cowl 54 and then to the rear of the radiator 46. This makes it possible to stir hot air rearward of the radiator 46. Consequently, it is possible to suppress hot air staying rearward of the radiator.

As mentioned above, in the present disclosure, the fan cover may include a lateral wall that prevents the exhaust air exiting the radiator from flowing toward the other lateral side in the vehicle widthwise direction. According to this constitution, it is possible to suppress flow of the exhaust air from the radiator toward a leg of a driver on the other lateral side in the vehicle widthwise direction.

The engine may include an exhaust pipe extending on the other lateral side of the engine in the vehicle widthwise direction. According to this constitution, the exhaust pipe is disposed opposite to the radiator in the vehicle widthwise direction, and therefore, it is possible to suppress the exhaust air that has passed through the radiator being heated by the exhaust pipe and flowing toward a leg of a driver.

The fan cover may include an upper half including a guide wall that guides the exhaust air from the radiator toward the one lateral side in the vehicle widthwise direction and a lower half that is open. According to this constitution, it is possible to suppress the exhaust air flowing toward a leg of a rider by the guide wall of the upper half of the fan cover and to secure an amount of air flow by the open lower half so as to secure cooling performance of the radiator fan.

In this case, the guide wall may guide the exhaust air from the radiator downward and toward the one lateral side in the vehicle widthwise direction. According to this constitution, hot air below the radiator can be stirred. This makes it possible to suppress heat staying below the radiator.

The vehicle may include an intrusive-flow prevention structure that prevents the exhaust air exiting the radiator fan from flowing frontward of the radiator. According to this constitution, it is possible to prevent the exhaust air exiting the radiator fan from going back to the radiator along with incoming wind. Thus, cooling performance of the radiator can be secured.

The fan cover may include a cover opening defined therein. According to this constitution, the cover opening makes it possible, for example, to discharge the exhaust air from the radiator rearward and to secure an intake air amount of the radiator fan during idling. Thus, by dispersing the exhaust air and securing the amount of air flow, the cooling performance of the radiator can be secured.

The fan cover may include: a rear wall covering an upper half of the radiator fan from the rear of the radiator fan; a first lateral wall connected to the rear wall and covering the radiator fan from the other lateral side in the vehicle widthwise direction; and a second lateral wall connected to the rear wall and covering the radiator fan from the one lateral side in the vehicle widthwise direction, wherein the second lateral wall may include a protruding part protruding downward toward the one lateral side in the vehicle widthwise direction. According to this constitution, it is possible to prevent the exhaust air from flowing toward the other lateral side in the vehicle widthwise direction thanks to the first lateral wall and to stir the hot air below the radiator fan thanks to the second lateral wall. This makes it possible to suppress the exhaust air from the radiator fan flowing toward a leg of a driver while suppressing heat staying below the radiator.

In this case, the rear wall may include a cover opening defined therein that discharges the exhaust air from the radiator rearward. According to this constitution, the cover opening makes it possible, for example, to discharge the exhaust air from the radiator rearward and to secure an intake air amount of the radiator fan. Thus, by dispersing the exhaust air and securing the amount of air flow, the cooling performance of the radiator can be secured.

The vehicle may further include an inner cowl that is disposed in front of the radiator and guides incoming wind to the radiator, and the inner cowl may include a cowl opening defined therein that is located in an outer lateral part of the inner cowl in the vehicle widthwise direction and guides incoming wind rearward of the radiator. According to this constitution, the cowl opening guides the incoming wind to laterally outside of the inner cowl and then to the rear of the radiator, and therefore, hot air rearward of the radiator can be stirred. This makes it possible to suppress hot air staying rearward of the radiator and to promote discharge of the exhaust air.

The present disclosure will not be limited to the above embodiments, and various additions, modifications, or deletions may be made without departing from the scope of the disclosure. For example, although the above description is made with reference to an example of a motorcycle according to the present disclosure, the present disclosure may also be applied to other saddle-riding vehicles than motorcycles, such as three-wheelers and four-wheel buggies. Accordingly, such variants are included within the scope of the present disclosure.

What is claimed is:

1. A saddle-riding vehicle comprising:
an engine which is a drive source of the vehicle; and
a radiator in front of the engine and on one lateral side of a vehicle body in a vehicle widthwise direction with respect to a center line in the vehicle widthwise direction,
wherein the radiator includes:
a radiator body that allows coolant of the engine to flow through the radiator body;
a radiator fan at a rear face of the radiator body; and
a fan cover that covers the radiator fan from a rear of the radiator fan to guide exhaust air from the radiator to the one lateral side in the vehicle widthwise direction,
wherein the fan cover includes:
an upper half including a guide wall that guides the exhaust air from the radiator toward the one lateral side in the vehicle widthwise direction, and
a lower half that is open.

2. The saddle-riding vehicle as claimed in claim 1, wherein the fan cover includes a lateral wall that prevents the exhaust air exiting the radiator from flowing toward the other lateral side in the vehicle widthwise direction.

3. The saddle-riding vehicle as claimed in claim 1, wherein the engine includes an exhaust pipe extending on the other lateral side of the engine in the vehicle widthwise direction.

4. The saddle-riding vehicle as claimed in claim 1, wherein the guide wall guides the exhaust air from the radiator downward and toward the one lateral side in the vehicle widthwise direction.

5. The saddle-riding vehicle as claimed in claim 1, comprising an intrusive-flow prevention structure that prevents the exhaust air exiting the radiator fan from flowing frontward of the radiator.

6. The saddle-riding vehicle as claimed in claim 1, wherein the fan cover includes a cover opening defined therein.

7. A saddle-riding vehicle comprising:
an engine which is a drive source of the vehicle; and
a radiator in front of the engine and on one lateral side of a vehicle body in a vehicle widthwise direction with respect to a center line in the vehicle widthwise direction,
wherein the radiator includes:
a radiator body that allows coolant of the engine to flow through the radiator body;
a radiator fan at a rear face of the radiator body; and
a fan cover that covers the radiator fan from a rear of the radiator fan to guide exhaust air from the radiator to the one lateral side in the vehicle widthwise direction,
wherein the fan cover includes:
a rear wall covering an upper half of the radiator fan from the rear of the radiator fan;
a first lateral wall connected to the rear wall and covering the radiator fan from the other lateral side in the vehicle widthwise direction; and
a second lateral wall connected to the rear wall and covering the radiator fan from the one lateral side in the vehicle widthwise direction,
wherein the second lateral wall includes a protruding part protruding downward toward the one lateral side in the vehicle widthwise direction.

8. The saddle-riding vehicle as claimed in claim 7, wherein the rear wall includes a cover opening defined therein that discharges the exhaust air from the radiator rearward.

9. The saddle-riding vehicle as claimed in claim 1, further comprising an inner cowl that is disposed in front of the radiator and guides incoming wind to the radiator,
wherein the inner cowl includes a cowl opening defined therein that is located in an outer lateral part of the inner cowl in the vehicle widthwise direction and guides incoming wind rearward of the radiator.

* * * * *